United States Patent [19]
Cagle et al.

[11] 4,225,964
[45] Sep. 30, 1980

[54] DETECTION MEANS FOR PROVIDING MULTIPLE BAUD VALUES PER INDIVIDUAL BAUD PERIOD OF A CARRIER SIGNAL TO OBVIATE BAUD TIMING AMBIGUITIES

[75] Inventors: George C. Cagle, Plano; Eric K. Weeren, Richardson, both of Tex.

[73] Assignee: Rockwell International Corporation, El Segundo, Calif.

[21] Appl. No.: 15,672

[22] Filed: Feb. 26, 1979

[51] Int. Cl.³ .................. H04L 27/32; H03D 3/22
[52] U.S. Cl. ........................... 375/86; 375/95; 375/119
[58] Field of Search ............ 325/320; 178/66 R, 88; 307/210; 328/133, 134, 140; 329/104, 105, 107; 364/111, 484, 485, 701, 702, 703; 340/170, 310, 310 A; 375/80, 82, 86, 94, 95, 119

[56] References Cited
U.S. PATENT DOCUMENTS

| | | | |
|---|---|---|---|
| 4,057,759 | 11/1977 | Genova et al. | 178/88 |
| 4,076,956 | 2/1978 | Dogliotti | 178/88 |
| 4,088,957 | 5/1978 | Perkins | 325/320 |
| 4,090,145 | 5/1978 | Webb | 328/140 |
| 4,131,882 | 12/1978 | Hollabaugh | 340/310 A |

*Primary Examiner*—Benedict V. Safourek
*Attorney, Agent, or Firm*—Howard R. Greenberg; H. Fredrick Hamann

[57] ABSTRACT

Digital data borne by a carrier signal via a predetermined variation in some characteristic thereof during each baud period with respect to the same characteristic of a reference signal is detected by subdividing each baud period into n intervals, converting the carrier signal characteristic variation to a DC signal which is integrated over a baud period beginning with the inception of each of the intervals and converting to and storing the equivalent data baud value of each integrated DC signal, thus providing multiple messages from which to select a valid message.

24 Claims, 5 Drawing Figures

DETECTION MEANS FOR PROVIDING MULTIPLE BAUD VALUES PER INDIVIDUAL BAUD PERIOD OF A CARRIER SIGNAL TO OBVIATE BAUD TIMING AMBIGUITIES

BACKGROUND OF THE INVENTION

The invention herein pertains generally to digital communications and specifically to the detection of baud values where the data bauds are conveyed by an AC carrier signal.

The transmission of digital data by varying some characteristic of an AC carrier signal, such as its phase or frequency, commonly referred to as phase shift and frequency shift keying, respectively, is widely practiced. Intrinsic to this mode of communications is the need to establish appropriate symbol (also referred to as baud) timing at the receiver to identify the beginning and termination of each baud period, wherein a single unit of data comprising one or more data bits is transmitted, to permit the detection thereof. As is well documented in the technical literature, including U.S. Pat. No. 3,368,036 entitled "Demultiplexing and Detecting System for Predicted Wave Phase Pulse Data Transmission System" owned by the same assignee herein, a common technique to detect the value of each data baud is one known as "integrate and dump" wherein a signal is allowed to linearly vary over the baud period with a polarity which is a function of the carrier signal characteristic vis-a-vis some reference signal, thereby defining the baud value. The efficacy of this detection technique is based on encompassing each integration period within the associated transmitted baud period so that it does not overlap into the next baud period, and consequently the need for developing appropriate symbol timing in the receiver.

One conventional method for affording appropriate symbol timing is to transmit along with the carrier signal a pilot tone so that the receiver timing can be synchronized to that employed in the transmitter. In some communications media, however, this tone and its associated equipment can be eliminated by employing a synchronizing signal which is intrinsically available at both the transmitter and receiver. For example, in the evolving technical field of power line communications for permitting electric utility companies to transmit communication signals over their distribution power lines to remotely control customer loads and monitor energy consumption, symbol timing can be derived from the 60 hertz power system itself since the transmitter and receiver are both connected thereto. Relying on the 60 hertz power signal as a synchronizing agent, however, creates a problem in selecting the proper cycle during a given baud period as well as the point of the AC cycle to which to synchronize. Since the zero crossing of an AC signal is the most discernible and therefore most logical point to which to synchronize, this is the common practice. However, ambiguities arise, the severity of which is dependent on the baud rate. As an example, if one were to transmit at a data rate of 60 baud/second, there would be one 60 hertz AC cycle and concomitantly two zero crossings per baud between which to choose for synchronization. At a lower rate, for instance 20 baud/second, there would be three 60 hertz AC cycles and concomitantly six zero crossings per baud to contend with. If the integration period corresponding to an individual baud were to be initiated on the wrong zero crossing, it then would overlap into the consecutive baud period, rendering it more difficult to accurately detect data by adding to or subtracting from the integrated value which would have been obtained if the integration had been initiated at the right zero crossing.

In view of the foregoing, it is an object of the present invention to provide a new and improved means for detecting digital data conveyed by the varying characteristic of a carrier signal.

It is a further object of the present invention to provide such a new and improved means which obviates ambiguities encountered when deriving the symbol timing from a signal having multiple zero crossings during each baud period.

It is still a further object of the present invention to provide such a new and improved means which may be digitally implemented so as to realize the economic benefits of large scale integration techniques.

The foregoing objects, as well as others, and the means by which they are achieved through the present invention may best be appreciated by referring to the Detailed Description of the Preferred Embodiment which follows together with the appended drawings.

SUMMARY OF THE INVENTION

In accordance with the stated objects, the invention herein enhances the detection of digital data transmitted by carrier signal by providing multiple baud values for the individual data bauds conveyed by the carrier wherein each individual baud is defined by a predetermined variation in a characteristic of the carrier during the baud period with respect to the same characteristic of a reference signal (which can be the carrier signal itself for differential type modulation). By deriving multiple baud values rather than a single one per baud period as is conventionally done, multiple messages can be formulated to enhance the opportunity of discerning from thereamong a valid message, which herein is preferably done by monitoring the messages for predetermined bit patterns. The multiple baud values per individual data baud period are provided by subdividing each baud period into n intervals, preferably equal to the number of zero crossings per baud period of the systemwide AC signal from which the transmitted symbol timing is derived when such a signal is present, converting the carrier signal characteristic variation to a DC signal which is integrated over a baud period beginning with the inception of each of the intervals and converting to and storing the equivalent data baud value of each integrated DC signal. The n baud values are sequentially arranged into n messages on a cyclical basis as they are generated until, preferably, a valid message is discerned upon recognition of a predetermined bit pattern in selected fields of the message.

In the preferred embodiment, wherein $4\phi$ differential phase shift keying (DPSK) is used, so that two bits are transmitted during each baud period, and the reference signal is the carrier signal itself with the phase of the carrier, during each baud period, providing a reference against which to measure the phase of the carrier signal during the consecutive baud period, each integrated DC signal is converted to a digital equivalent which is stored for a period corresponding to n intervals subsequent to detecting the baud value corresponding to that integral so that it may be used as a reference against which to measure the DC integral for the $n^{th}$ successive interval. Two pairs of integrators are employed to permit one pair of integrators to integrate (one integrator corresponding to the in phase component and the other to the quadrature component of the carrier signal) while the other pair is discharged to an initial state to prepare it for integrating during the consecutive interval. By alternating the integration operation in this fashion, sufficient time is assured to properly initialize each integrator preparatory to its integrating cycle, thus affording multiple integrations during each baud period with a minimum number of integrators. Preferably the integration of the DC signal over a baud period is done with partial integration rather than a single one by integrating the signal during each of the n intervals and summing the value attained at the end of the interval with the integrated value attained for the previous n−1 intervals. This partial integration technique is the subject of a commonly owned copending patent application, Ser. No. 015,276, entitled "Means for Subdividing a Baud Period into Multiple Integration Intervals to Enhance Digital Message Detection" filed concurrently herewith. The integrated analog values are converted to digital values through an A/D converter and then stored in registers whereupon they are digitally added and then stored for comparison with the preceding stored summations functioning as reference signals to develop the baud values. Then the baud values are stored for formulating the multiple messages from among which a valid message is selected.

DETAILED DESCRIPTION OF THE PREFERRED EMBODIMENT

Only for purposes of exemplification, the subject invention will be described in connection with a commercial communications system developed by the assignee herein known as Kineplex which entails transmitting digital data via a carrier signal employing 4φ differential phase keying (DPSK) so that two bits of data correspond to each baud period and the phase of the carrier signal acts as a reference for the consecutive baud period. This system is described at length in U.S. Pat. No. 3,368,036, previously alluded to, and therefore will be treated only briefly herein as is necessary to afford an understanding of the subject invention. Also, once again only for exemplary purposes, the invention will be described in conjunction with the partial integration approach specifically addressed by copending application Ser. No. 015,276 previously alluded to.

As delineated in the U.S. Pat. No. 3,368,036 the phase angle of a carrier signal is advanced 45° or some odd multiple thereof during each baud period from the previous baud period, with the change being dependent on which one of the four combinations of two binary data bits is engendered in the digital information to be transmitted during that period. The data contained in the baud period is detected at the receiver by mixing with the carrier signal two AC signals of like frequency equal to that of the carrier, but differing in phase angle by 90°, which produces two output signals having respective DC components whose polarities are a function of the sine of the carrier phase angle, when referenced to some fixed angle for one of the signals (quadrature component) and its cosine for the other signal (in phase component). These signals are separately integrated over the baud period, at the end of which they are combined with their counterparts for the previous baud period to yield the in phase (cosine) and quadrature phase (sine) components of the phase difference in the carrier signal between two consecutive baud periods which then defines the two data bit values by virtue of the respective trigonometric signs.

Figure 1:
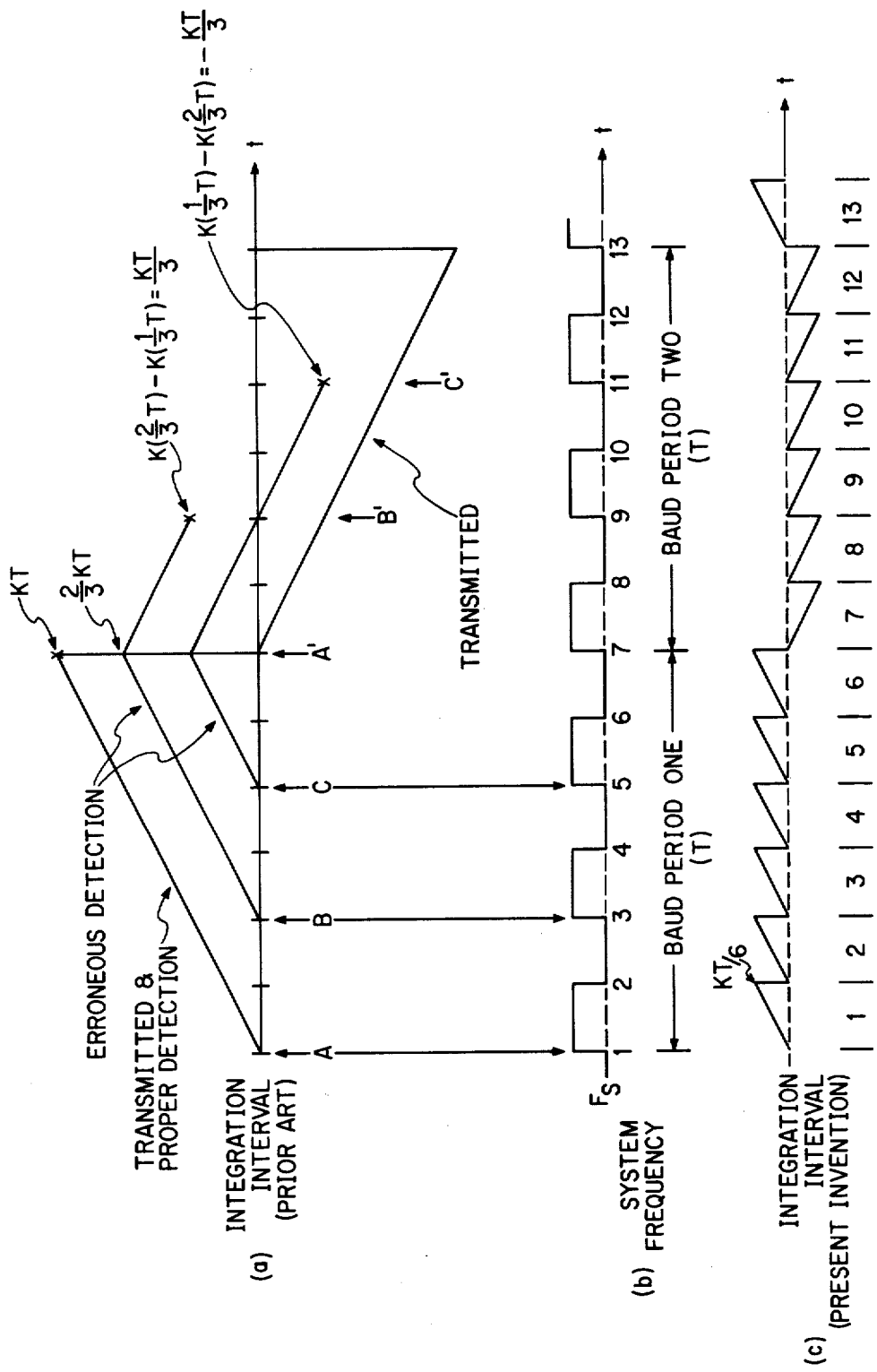
FIG. 1 consists of waveforms expository of the invention.

The foregoing is represented as the first integration waveform (a) in FIG. 1 designated prior art. This waveform (a) corresponds to only one of the DC components being integrated and it is to be realized that the second component needed to define a baud comprising two bits is not shown since it would not contribute to the understanding of the reader. Assuming that the symbol timing was derived from waveform (b) designated $F_s$ for the system frequency AC signal, it will be observed that each baud period, and consequently each integration period, corresponds to three full cycles of $F_s$. Specifically, $F_s$ could be a system frequency such as found on the 60 hertz electric power system in the United States (limited in amplitude so as to produce the depicted square wave) with three cycles thereof then representing a data rate of 20 baud/second. Further assuming that a data period designated baud period one was transmitted coincident with the first zero crossing of $F_s$, at point A, the detector in the receiver would properly begin integrating at point A and terminate at point A' to afford an integrated value equal to kT where k can be any real number and T is the baud period 1/(Baud Rate or 50 ms = 1/20 herein). Now, through error, assume that rather than the first zero crossing shown for $F_s$ at point A in waveform b, the third zero crossing commencing with the second cycle designated point B, is chosen on which to begin the integration process. In this case, the integrated signal would linearly increase to a value of k(2/3T) at point A' and then decrease to a value of kT/3 at B' (assuming the value for baud period two would result in a negative DC trigonometric component) because of the overlap of the integration operation for baud period one into baud period two. Thus, instead of generating the proper value of kT for baud period one, kt/3 would be realized. Even though it is the polarity of the integrated value which determines the baud value, deviations in the magnitude thereof render the detection process more difficult to effectuate and, in fact, can introduce data errors created by a degradation in signal/noise ratio for the integrated signal. As an example, were the integration period for baud period one to begin on the fifth zero crossing at $F_s$ at point C, the integrated value attained would be −kT/3, clearly erroneous because of the negative, rather than positive sign.

The subject invention obviates the foregoing problem by subdividing the baud period into n intervals, such as six shown in waveform (c) of FIG. 1, for the system frequency signal $F_s$ having six zero crossings per baud period and developing n (six) baud values corresponding thereto. Rather than integrate over the entire period as represented by waveform (a), which would entail six integrators or a reduction in baud timing acquisition as explained in copending application Ser. No. 015,276, the integration process is preferably separately applied to each of the n intervals wherein each integration is initiated at the beginning of the interval and terminated at its end over each AC signal $F_c$ half-cycle. Thus, as shown by waveform (c), six separate integrations are performed during baud period one, rather than the single one of waveform (a). The integrated value attained at the end of each interval is then added to the corresponding values for the preceding $n-1$ intervals or five in the example of waveform (c). Thus, at the end of interval 6 its value, KT/6, is added to that for intervals 1-5 to yield kT. Similarly, the integrated value attained at the end of interval 7 is added to the values corresponding to intervals 2-6. The foregoing integrated value summation is repeated at the end of each of the subsequent intervals by adding the integrated value attained to the previous five intervals. Consequently, each baud period gives rise to n or in the depicted example six integrated value summations, indicative of the baud value rather than the single value of waveform (a). These six values can then be arithmetically processed in various ways to optimize the validity of the detected data. For example, a very simple preferred way to be described hereinafter merely entails storing the n baud values in n registers on a cyclical basis and then selecting the first recognizable digital message via predetermined bit patterns.

When an absolute reference frequency is employed, the integration process is performed after mixing the carrier signal with the reference frequency so that the polarity of each integrated value and consequently integrated value summation automatically determines the baud value. However, when the modulation is not predicated on an absolute reference but rather DPSK where the reference signal during each baud period is derived from the carrier signal for the immediately preceding buad period, the carrier signal phase in the detected baud period is relative and therefore the integrated value summation attained at the end of each interval must be compared with its counterpart for the preceding period. Accordingly, the summations are stored for an additional period of time subsequent to their development so that they can be used as reference against which to compare successive summations. For example, in deriving the vaud value corresponding to interval 12, the integrated value summation for the six intervals 7-12 is compared with that for the six intervals 1-6. Similarly, the baud value corresponding to interval 13 is derived by comparing the integrated value summation for the six intervals 8-13 with that for the six intervals 2-7.

Figure 2:
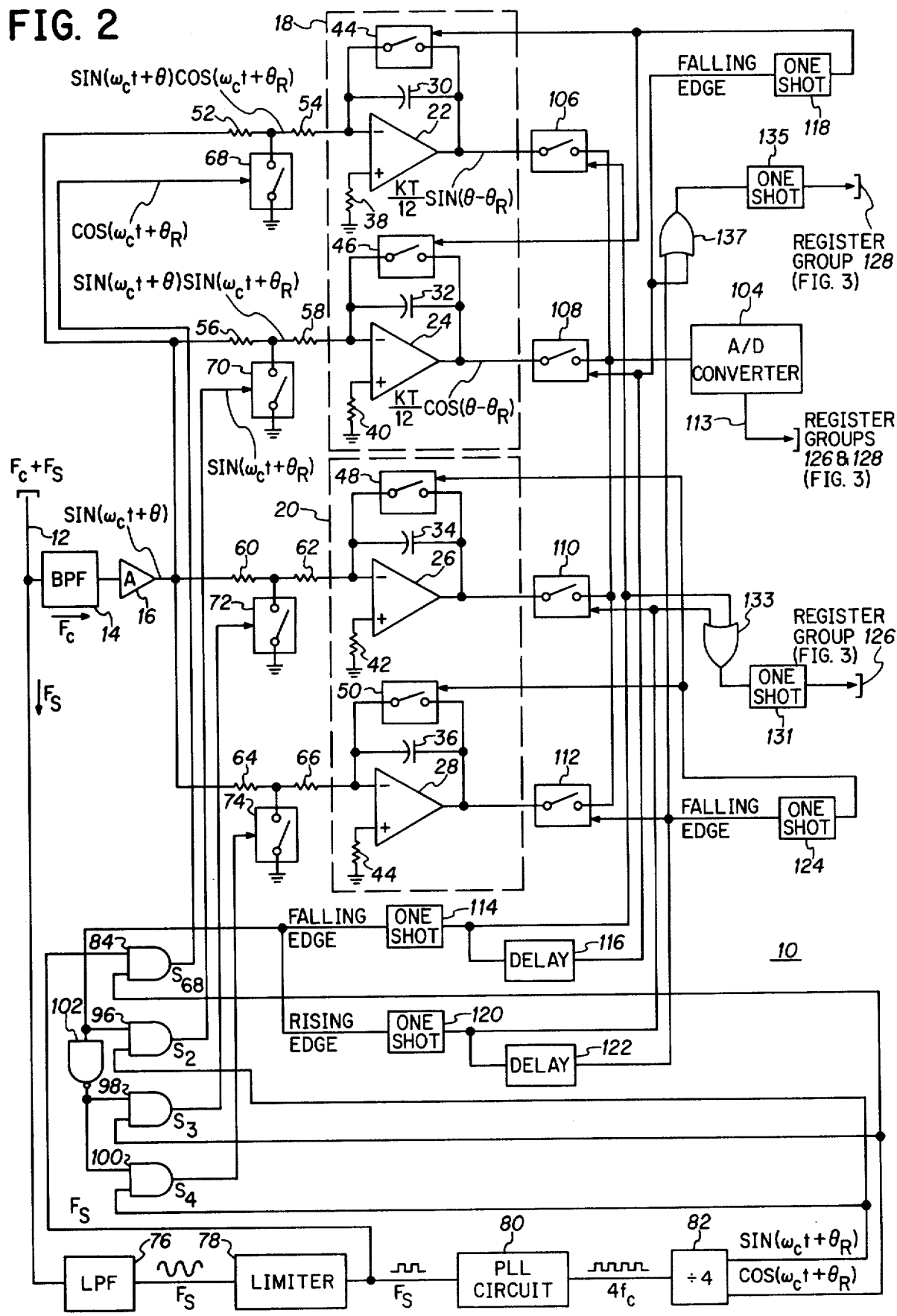
FIG. 2 depicts the integration and associated timing circuitry of the invention.

Referring now to FIG. 2, the preferred apparatus for providing the individual integration values will be described. As shown therein, the apparatus designated generally by the reference numeral 10, receives the AC carrier signal $F_c$ in which the data bauds are conveyed and the system frequency signal $F_s$ over lead 12 which would be connected to the electric power system where the carrier signal $F_c$ was transmitted thereover and $F_s$ corresponds to the 60 hertz power line frequency. $F_c$ is passed through a bandpass filter 14, whose bandpass is centered about the carrier frequency, and then amplified by amplifier 16 whose output is then the pure carrier signal $F_c$ defined as $\sin(\omega_c t + \theta)$ where $\omega_c = 2\pi f_c$ with $f_c$ being the carrier frequency and $\theta$ the phase angle, the characteristic of the carrier signal which defines the baud value. In other modulation schemes, the characteristic could just as well be either the frequency or amplitude of the carrier signal. The output of amplifier 16 is connected to a pair of integrating circuits 18 and 20, each of which comprises a pair of operational amplifiers, 22 and 24 for circuit 18, and 26 and 28 for integrating circuit 20. These four operational amplifiers 22-28 are arranged exactly the same so as to function as integrators and, as such, respectively comprise four capacitors 30-36 interconnecting their respective outputs with their inverting (−) inputs, four resistors 38-44 connecting their non-inverting (+) inputs to ground and symbolically depicted four switches 44-50 respectively connected across capacitors 30-36. The output of amplifier 16, $F_c$ is applied to the inverting inputs of amplifiers 22-28 through series connected resistors 52 and 54, 56 and 58, 60 and 62, and 64-66, respectively. The interconnection point of each pair of the foregoing series resistors is connected to ground through switches 68-74, respectively associated with amplifiers 22-28. These switches, which are depicted symbolically, would normally be implemented through a solid state design.

As is well known, cyclically controlling by a square wave the closure of a switch such as 68 which is connected to a signal path in synchronous detection producers the product of the signal entering the path and the Fourier sinusoidal components of the square wave at the output of the switch. Consequently, applying to switch 68 a square wave signal whose fundamental component is $\cos(\omega_c t + \theta_R)$, where $\omega_c = 2\pi f_c$, $f_c$ being the carrier frequency and $\theta_R$ is some fixed reference phase angle, produces a signal to the inverting input of amplifier 22 equal to $\sin(\omega_c t + \theta) \cos(\omega_c t + \theta_R)$ which has a DC component that is proportional to $\sin(\theta - \theta_R)$ [which in this case is equal to $\sin(\theta - \theta_R)$ since the sinusoidal signals are assumed to have unity amplitude]. This result is clearly described in the '036 patent, previously referred to, in connection with FIG. 1 thereof, where it will be recognized that mixer 18 for producing the requisite product has been preferably supplanted by electronic switch 68 of the subject invention as shown in FIG. 2 herein. None of the other products of the carrier signal and Fourier components produce a DC signal and are therefore of no interest. With switch 44 open and switch 68 operational in accordance with the control square wave signal represented by its fundamental component $\cos(\omega_c t + \theta_R)$, applied thereto, the DC voltage applied to the inverting input of amplifier 22 will cause the voltage developed across capacitor 30 to linearly vary, thus providing at the output of amplifier 22 the integrated value of the DC component with a like polarity. Since switch 68 is closed during every other half cycle for $F_c$, which time amplifier 22 cannot integrate, this half-wave integration process does not produce a smooth ramp as shown in waveform (c) of FIG. 1 but rather a sequence of ramps separated by steps. This, of course, only affects the integrated value attained at the end of the integration interval and not the integration principle. If a smooth ramp over the full integration interval is desired, then the circuitry of FIG. 2 can be supplemented with that of FIG. 5, to be explained shortly. If the integration period is made equal to one of the intervals corresponding to waveform (c) of FIG. 1, the value attained at the end of the integration interval will be equal to $KT/12 \sin(\theta - \theta_R)$. By going through the same steps as the foregoing, it will be readily seen that the application to switch 70 of a control square wave signal whose fundamental component is sin $(\omega_c t + \theta_R)$ will produce at the output of amplifier 24 at the end of an integration interval KT/12 cos $(\theta - \theta_R)$ so long as switch 46 remains open for the interval.

When an absolute reference signal separate and apart from the carrier signal is employed, such as in absolute modulation schemes, the control signals sin $(\omega_c t + \theta_R)$ and cos $(\omega_c t + \theta_R)$ would be derived directly from the reference signal so that $\theta_R$ would normally be 0 and the signs of sin $(\theta)$ and cos $(\theta)$ would automatically define the baud value. In such case, much of the apparatus shown in FIG. 3 for the DPSK implementation could be eliminated as will become clear hereinafter. However, when DPSK is employed such as herein, the baud value is determined by eliminating $\theta_R$ and developing the sin and cos of $(\theta_2 - \theta_1)$, where the subscript 2 corresponds to the baud period being detected and the subscript 1 corresponds to the preceding baud period. This will be explained later on.

In a similar fashion to the foregoing, cos $(\omega_c t + \theta_R)$ and sin $(\omega_c t + \theta_R)$ are applied respectively to switches 72 and 74 to produce at the outputs of amplifiers 26 and 28 KT/12 sin $(\theta - \theta_R)$ and KT/12 cos $(\theta - \theta_R)$ for also defining the carrier phase angle during some interval (vis-a-vis a fixed reference phase angle $\theta_R$). While one of the integrating circuits 18 and 20 is integrating, the other one is initialized (but only after an analog to digital conversion is performed as explained hereinafter) to prepare it for its integrating interval by discharging the associated capacitors through the associated switches connected thereacross. For example, if switches 44 and 46 were open during interval 1 for waveform (c) of FIG. 1, while switches 68 and 70 were operational, integrating circuit 18 would in fact be integrating, during which time switches 48 and 50 would be closed to discharge their respective capacitors 34 and 36 to prepare integrating circuit 20 for its integration cycle during integration interval two. Of course, during interval two, switches 44 and 46 would be closed to permit their respective capacitors 30 and 32 to discharge so as to prepare integrating circuit 18 for its next integrating cycle during interval three. Thus, it is seen that integrating circuit 18 integrates during the odd numbered intervals and discharges during the even numbered intervals, while integrating circuit 20 conversely integrates during the even numbered intervals and discharges during the odd numbered intervals.

Figure 4:
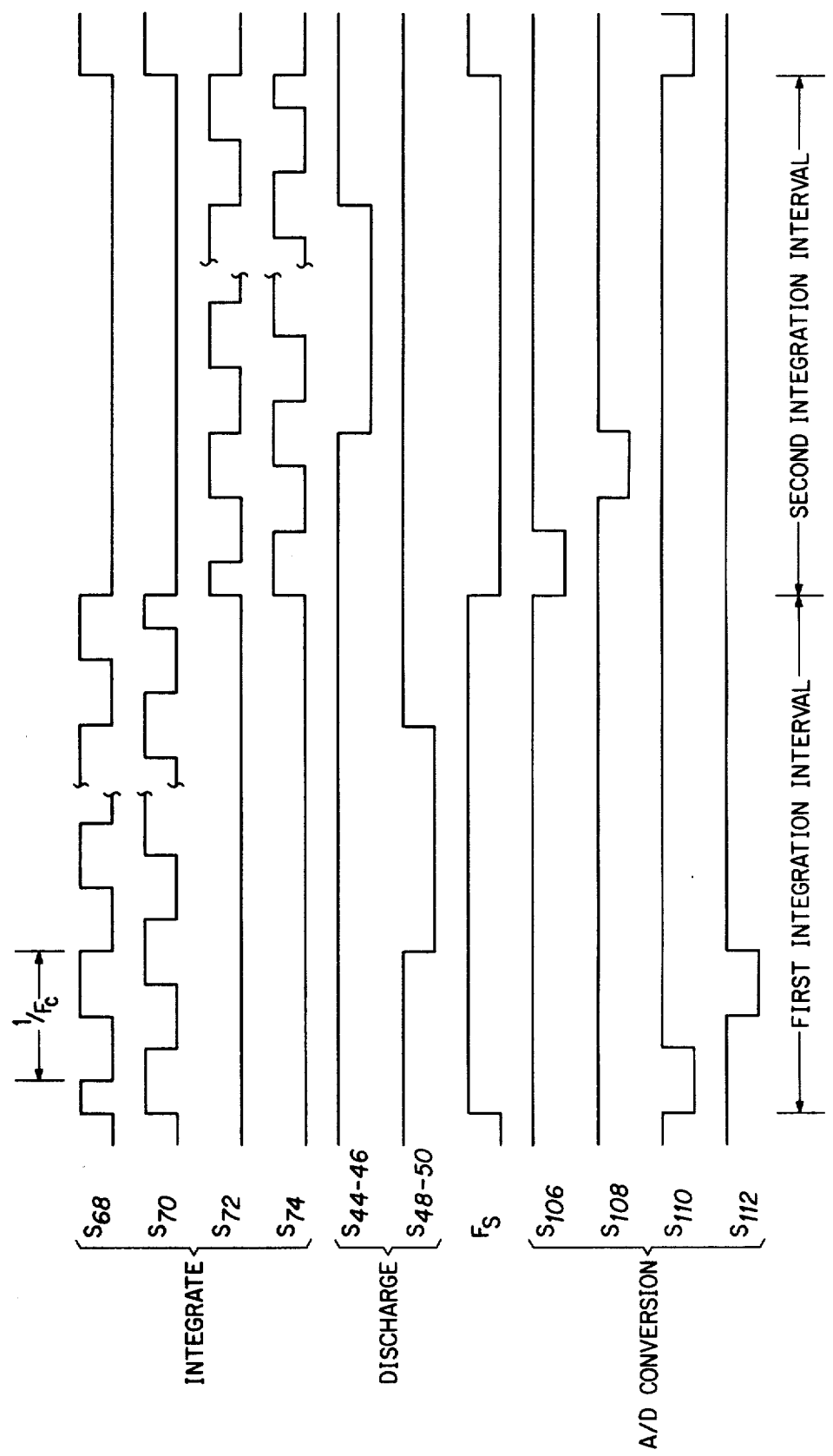
FIG. 4 consists of timing waveforms for use in conjunction with FIGS. 2 and 3 to facilitate an understanding of the invention.

The foregoing switch operations are reflected in the timing waveforms depicted in FIG. 4 wherein the first four waveforms are associated with controlling the operation of switches 68–74, respectively, and the next two waveforms control switches 44 together with 46 and 48 together with 50, respectively. A high level signal for the waveforms of FIG. 4 corresponds to a switch being open, while a low level signifies that the switch is closed. The waveforms of FIG. 4 are generated from the system frequency signal $F_s$ by first passing it through a low-pass filter 76 shown in FIG. 2 which eliminates unwanted frequencies such as the carrier signal $F_c$ and then, through the limiter 78, to provide an output signal which is a square wave whose frequency and phase are consonant with $F_s$. The output of limiter 78 is applied to a phase lock loop circuit 80 to produce at its output a square wave whose frequency is four times that of the carrier signal frequency $F_c$ which is locked together with the phase to the system frequency $F_s$. Thus as $F_s$ varies in frequency, as it may do so under adverse conditions, so does the frequency 4 $f_c$ at the output of phase lock loop circuit 80. The output of phase lock loop circuit 80 is applied to a divide by 4 circuit 82 having two outputs which have a frequency equal to that of the carrier signal frequency $f_c$ and a phase angle $\theta_R$ with reference thereto, and which are represented mathematically only by their respective fundamental sinusoidal components. The two outputs have a phase angle difference of 90° so that one constitutes a sine function with the other constituting a cosine function. The cosine output of divide by 4 circuit 82 is connected as a first input to an AND gate 84 having a second input from the output of limiter 78 so that the gate is enabled to pass the square wave to its output $s_{68}$ during the first integration interval of $F_s$ shown in FIG. 4, as well as all successive odd integration intervals. During these odd integration intervals when AND gate 84 is enabled, the single $s_{68}$ is applied to switch 68 to cause it to synchronously open and close which as already mentioned is equivalent to the mixing function of mixer 18 of FIG. 1 of the '036 patent previously alluded to. Consequently, the product of sin $(\omega_c t + \theta)$ and cos $(\omega_c t + \theta_R)$ is formed at the interconnection of the switch 68 with resistors 52 and 54. During this time it is to be noted that switches 44 and 46 are open to permit their respective capacitors 30 and 32 to linearly build up voltage during the integration interval. Since switch 68 is closed half the time during the integration interval, which inhibits the capacitor from receiving any charging current, as mentioned earlier the integration waveform would not be a smooth ramp as depicted in FIG. 1, but rather a sequence of little ramps (when switch 68 is open during the high level half cycles of the square wave) connected by flat portions when switch 68 is closed (during low level portions of the square wave $s_{68}$).

Figure 5:
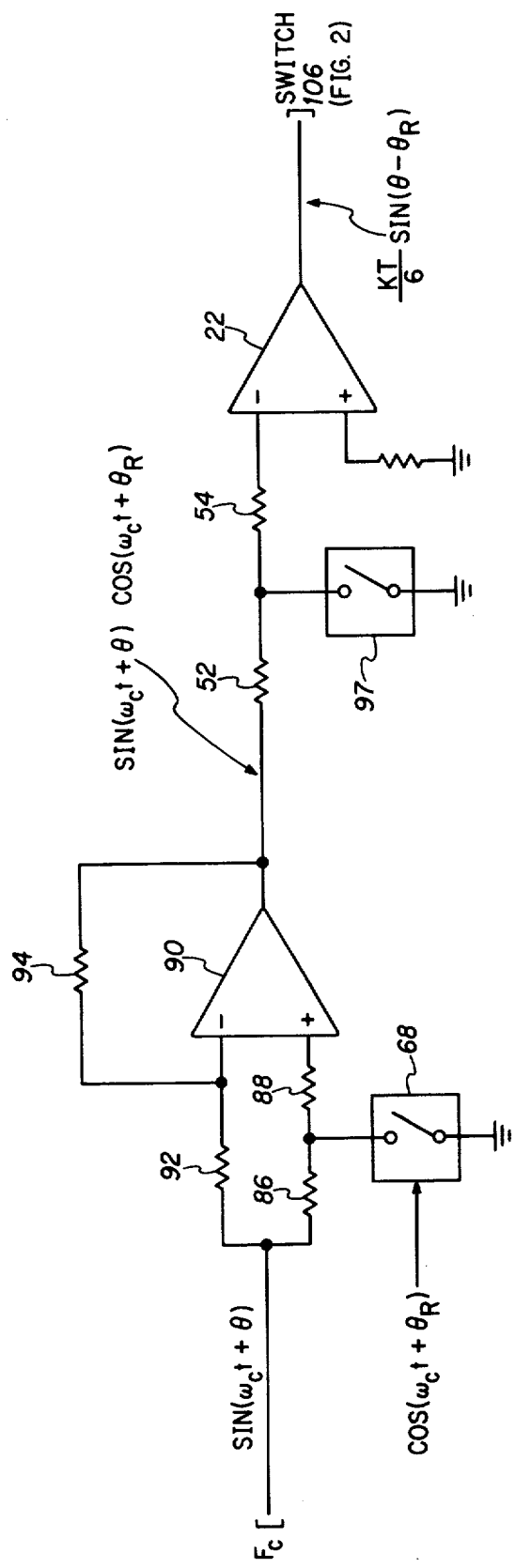
FIG. 5 shows circuitry supplementary to that of FIG. 2 for affording full-wave integration rather than half-wave in the detection process.

If integration throughout an integration interval is desired, for example to generate a high integration signal, then each of the operation amplifiers 22-28 can be supplemented with additional circuitry as shown in FIG. 5 in connection with operational amplifier 22. It will be seen therein that the mixing and integrating functions have been totally separated by connecting the synchronous switch 68 to the interconnection point of a pair of resistors 86 and 88, with resistor 88 being connected by the noninverting input of another operational amplifier 90. The carrier signal $F_c$ is applied to the noninverting input of operational amplifier 90 through the series resistors 86 and 88 as well as to the inverting input via a resistor 92. With another resistor 94 interconnecting the output and the inverting input of the operational amplifier 90, a full-wave mixer with a gain of one is provided, by making resistors 92 and 94 the same value, and 86 and 88 as well. So long as a new switch 97, connected to the interconnection of resistors 52 and 54 associated with operational amplifier 22, is left open during the full integration interval, a smooth linear ramp will be obtained at the output of amplifier 22 without any steps in the waveform.

At the end of the first integration interval, the output of operational amplifier 22 is the integrated value of the DC component for the product of the sin $(\omega_c t + \theta_1)$ and cos $(\omega_c t + \theta_R)$, namely KT/12 sin $(\theta_1 - \theta_R)$. In a similar fashion it will be seen that the output of operational amplifier 24 at this time is KT/12 cos $(\theta_1 - \theta_R)$ because of the application to switch 70 of sin $(\omega_c t + \theta_R)$ via an AND gate 96 having a second input derived from the output of limiter 78. Furthermore, it will be seen that the outputs of operational amplifiers 26 and 28 at the end of the second integration interval are respectively KT/12 sin $(\theta_2-\theta_R)$ and KT/12 cos $(\theta_2-\theta_R)$ by virtue of the application of cos $(\omega_c t+\theta_R)$ to switch 72 via an AND gate 98 and sin $(\omega_c t+_R)$ to switch 74 via an AND gate 100. Both AND gates 98 and 100 have a second input which is derived from the output of limiter 78 after first inverting the signal through inverter 102. Consequently, these AND gates are enabled to pass their respective square waves during the even integration intervals associated with the system frequency $F_s$.

The outputs of amplifiers 22-28 are connected to an analog/digital (A/D) converter 104 via four individual switches 106-112 respectively associated therewith. The analog integrated value outputs of amplifiers 22-28 are thus converted to digital equivalents at the output of A/D converter 104 on bus 113 (which preferably comprises multiple leads for parallel bit operation) in multiplex fashion by sequentially closing switches 106-112. For example, switch 106 is closed upon the termination of the first integration interval by a low level signal generated at the output of a one shot multivibrator 114 which is triggered by the falling edge of the output of limiter 78, namely $F_s$. After sufficient time has transpired for the conversion to be effected, switch 106 is opened at the end of the one shot period and switch 108 is closed by the same output from one shot 114 via a delay circuit 116. Following the A/D conversions for the outputs of amplifiers 22 and 24, their respective capacitors 30 and 32 are discharged by the closure of the switches 44 and 46. The signal for this operation is derived by triggering a one shot multivibrator 118 by the falling edge output from delay circuit 116. In similar fashion, switch 110 is closed during each odd integration interval, after its associated integrating circuit 20 even integration interval, by the output of a one shot multivibrator 120, which is triggered by the rising edge of the output of limiter 78. Switch 112 is thereafter closed by first passing the output of one shot 120 through a delay circuit 122. Switches 48 and 50 are closed to discharge their respective capacitors 34 and 36 through a one shot multivibrator 124 which is activated by the falling edge of the output of delay circuit 122. The timing waveforms corresponding to the foregoing discharge and conversion operations are shown in FIG. 4.

Figure 3:
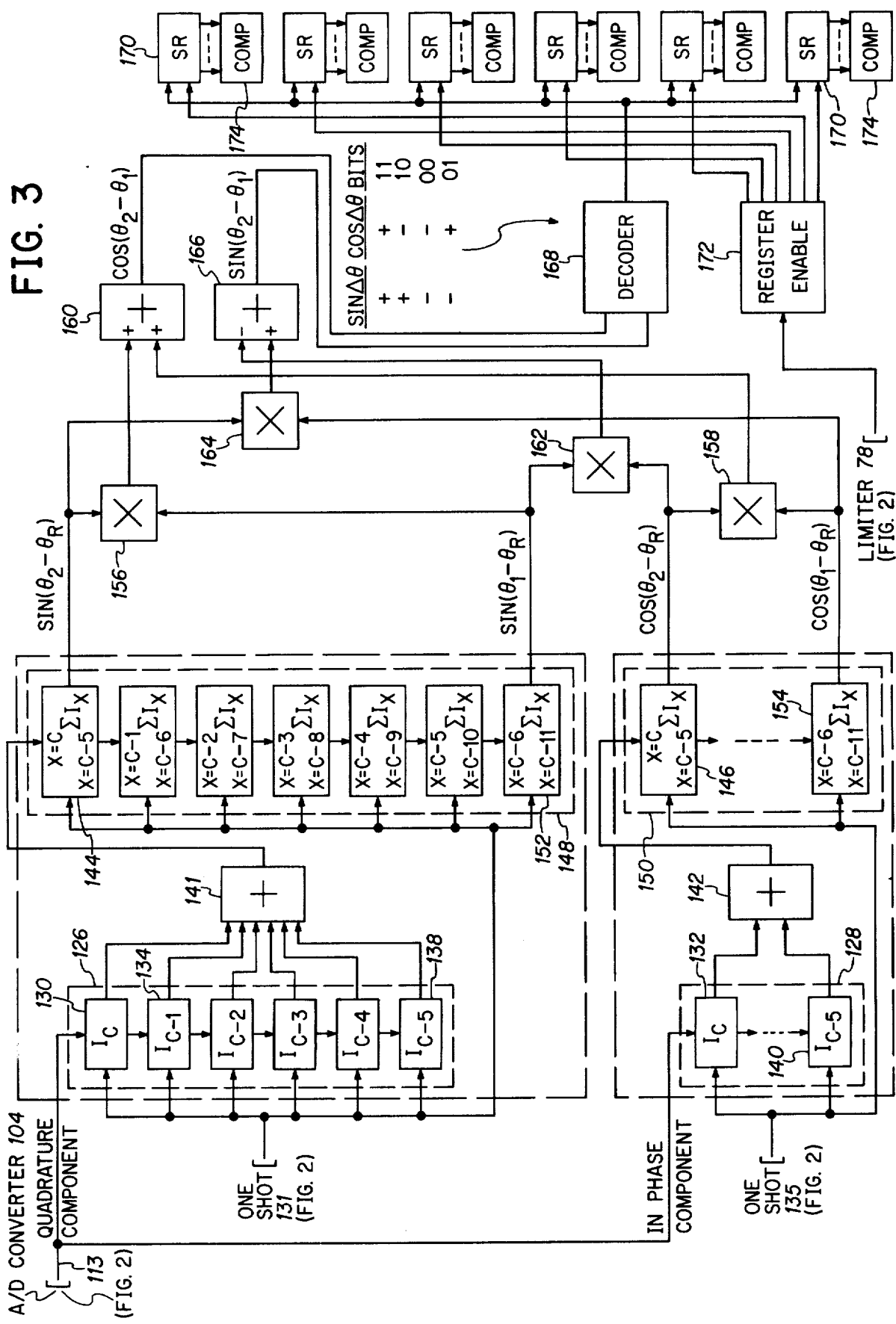
FIG. 3 depicts the digital components of the invention for storing and combining the various digital signals to derive the multiple baud values for the individual data bauds.

As shown in FIG. 3, the storage circuitry for retaining the digital integrated value outputs of A/D converter 104 on lead 113 comprises one group of six series connected registers 126 corresponding to the quadrature (sine) component, and another set of six series connected registers 128 corresponding to the in phase (cosine) component. Each time a new integrated digital value $I_c$ (the subscript c denoting current interval) is generated at the output of A/D converter 104, it is stored in the first register of a register group, the quadrature component being placed into register 130 of group 126, and the in phase component into register 132 of group 128. Just prior thereto the value in each register is shifted to the next register in the series chain so that the value that had been stored in register 130 is passed to register 134 and likewise, the value that had been stored in register 132 is passed to the next register (not shown) in the chain for group 128. The values stored in the last register of the register groups, namely 138 for group 126 and 140 for group 128, are no longer retained when supplanted by the new value received from the preceding register. The foregoing is represented by the notation $I_{c-1}$ through $I_{c-5}$ for the registers in groups 126 and 128. The registers of register group 126 corresponds to the quadrature component are clocked by the output of a one shot multivibrator 131, shown in FIG. 2, which is triggered at the end of an A/D conversion operation by the lagging edge of the A/D control pulses (FIG. 4 waveform) for controlling qaudrature component switches 106 and 110 via an OR gate 133 whose inputs are connected to the outputs of one shot multivibrators 114 and 120. Likewise, the registers of register group 128 corresponding to the in phase component are clocked by the output of a one shot multivibrator 135 by the lagging edge of the A/D control pulses for controlling in phase component switches 108 and 112 via an OR gate 135 whose inputs are connected to the outputs of delay circuits 116 and 122.

Upon receipt of each new integrated digital value $I_c$, the outputs of the registers in each register group 126 and 128 constituting the corresponding integrated values for the previous five intervals (c−1 to c−5) are digitally summed by respective digital adders 140 and 142. The digital integrated value summations of adders 140 and 142, denoted $$\sum_{x=c-5}^{x=c} I_{x_s},$$

are then applied to registers 144 and 146 respectively, each of which is the first register of a group of seven series connected registers 148 and 150 respectively. As with the register groups 126 and 128, each register in groups 148 and 150 passes the digital value stored therein to the next succeeding register prior to receiving the digital stored value in the preceding register under the clock output of one shot multivibrators 131 and 135, respectively. Since there are seven registers in each group 148 and 150, the summations of six integrated values entered into the first registers 144 and 146 are eventually stored in the last registers 152 and 154 of groups 148 and 150 respectively, six integration intervals later. Also, since differential phase shift keying entails comparing each baud period with the previous baud period acting as a reference, and since six integration intervals constitute a full baud period cycle herein, the output of register 144, which is proportional to sin $(\theta_2-\theta_R)$, is compared with the output of register 152, which is proportional to sin $(\theta_1-\theta_R)$ where, the subscript 2 denotes a current summation period and the subscript 1 denotes the preceding summation period. Similarly, the outputs of registers 146 and 154, respectively proportional to cos $(\theta_2-\theta_R)$ and cos $(\theta_1-\theta_R)$ are employed in the comparison to eliminate the reference angle $\theta_R$ and obtain the phase angle advancement of $\theta_2-\theta_1$ in consecutive baud periods. Thus, as delineated in the '036 patent, the outputs of registers 144 and 152 are multiplied in digital multiplier 156 and summed with the product of the outputs of registers 146 and 154 appearing at the output of digital multiplier 158 in digital adder 160 to render the term cos $(\theta_2-\theta_1)$. The term sin $(\theta_2-\theta_1)$ is obtained by adding the product of the outputs of registers 152 and 146, available at the output of digital multiplier 162, to the negative value of the product of the outputs of registers 144 and 154, available at the output of digital multiplier 164, in digital adder 166. The signs of the output signals for adders 160 and 166 define the two bit values engendered by the baud as represented by the summation of integrated values corresponding to the six integration intervals, appearing serially at the output of decoder 168 with the designated format. Since there are six such intervals during each baud period it is readily apparent that there will be six values of baud data, each consisting of two bits, for selecting the proper baud value. These six values are stored in a group of six registers 170 by cyclical sequential application thereto under control of a register enable circuit 172 having a count of six which is triggered from the output at limiter 78 once during each integration interval. During each interval the two data bits defining the baud value are serially clocked from the output of decoder 168 into the enabled registers 170 in their proper order. The two clock pulses for entering the two serial bits in each of the registers 170 can simply be provided from register enable circuit 172 through a ring counter having a count of six whose output leads are individually connected to the registers 170 via a pair of one shot multivibrators for each lead (not shown). After two bits are entered in the last register 170, such as the bottom register, the next two bits are entered in the first register 170, such as the top register. In this fashion, the transmitted message consisting of any number of serial bits is formulated in the six registers 170. Although different methods are available for selecting which one or ones of the registers is most apt to have an error free message, the simplest and preferred way to select one of the registers for accessing the message is merely to monitor the entire message for a recognizable bit pattern in specified portions thereof, such as the preamble the address fields. The first register 170 to display the requisite bit pattern is the one considered to have an acceptable error-free message. The foregoing is effectuated with the use of a group of six comparators 174, each containing the same bit pattern against which to compare the contents of a different one of the registers 170. As soon as a successful comparison occurs, the comparator involved generates an output signal which may be used to transfer the message in its associated register to a permanent storage device for subsequent utilization (not shown).

As discussed earlier, the subject invention is equally applicable to absolute modulation schemes wherein the carrier signal characteristic variation during each baud period is relative to a fixed reference signal rather than the carrier signal characteristic during the previous baud period used in differential modulation schemes such as DPSK. In that case, the sinusoidal output from frequency divider 82 in FIG. 2 would be synchronized to the reference signal (e.g. using the circuitry as shown and generating the carrier signal $F_c$ at the transmitter from the system frequency signal $F_s$ through a frequency multiplier), with $\theta_R$ normally equal to zero. The $\sin \theta$ and $\cos \theta$ analog outputs of integrating circuits 18 and 20 and consequently their digital equivalents at the output of A/D converter 104 would then represent the data baud values without need to reference them to any other signal. Accordingly, the digital output of converter 104 can be applied directly to decoder 168 of FIG. 3, eliminating the need for all of the circuitry preceding decoder 168 shown in that figure.

As may be readily apparent, the retention of each integrated value summation for n subsequent intervals following its development for reference purposes, may be accomplished in ways other than just described in connection to FIG. 3. For example, in lieu of each group of seven registers 148 and 150, one could substitute six registers for storing the six integrated values corresponding to the seventh through twelfth integration intervals previous to the current integration interval and a digital adder for summing same. The output of this adder, would, of course, be equal to the output of register 152 for the quadrature component or register 154 for the in phase component to provide a reference against which to respectively compare the outputs of adders 140 and 142.

As demonstrated by the foregoing, the subject invention affords a facile means employing digital techinques to provide more than one datum from which to make a decision as to the baud data conveyed by a carrier signal where symbol timing engenders ambiguities. Although described with respect to $4\phi$ DPSK, it is to be recognized that the invention is not limited to PSK modulation nor the number of phases employed to achieve different data bits per baud. Nor is it limited to differential encoding since, as has been pointed out, an absolute signal reference could be employed with a concomintant simplification in circuitry. Also the bit rate is of no significance to the operativeness of the invention so that any number or bits could be transmitted per baud. Since modifications which do not necessarily depart from the scope and spirit of the invention herein may very well occur to those skilled in the art, the foregoing detailed description should be construed as merely exemplary and not circumscriptive of the invention as it will now be claimed hereinbelow:

What is claimed is:

1. Detection means for detecting digital data borne by a carrier signal via a predetermined variation in some characteristic thereof during each baud period with respect to the same characteristic of the carrier signal during the previous baud period, comprising:
   means for converting the carrier signal characteristic to a DC signal indicative of the digital data;
   timing means for subdividing each baud period into n plural intervals;
   integration means for integrating the DC signal over a baud period beginning with the inception of each of said n intervals and storing same for an additional baud period;
   comparator means for comparing each integrated DC signal with the integrated DC signal obtained n intervals previously to provide an indication of the data baud value, and
   storage means for storing each such data baud value.

2. The detection means of claim 1 wherein said storage means comprises n registers and means for sequentially entering the data baud values in said registers on a cyclical basis.

3. The detection means of claim 2, further including means for selecting one of said n registers from which to access the digital data.

4. The detection means of claims 1, 2 or 3 wherein said timing means is synchronized to an AC signal and n is equal to the number of zero crossings of said AC signal during each baud period, and whereby each interval is initiated at one of the zero crossings.

5. The detection means of claims 1, 2 or 3 wherein said integration means comprises means for integrating the DC signal over each of said n intervals and means for summing each integrated DC signal with the integrated DC signals obtained for the previous $n-1$ intervals.

6. The detection means of claim 4 wherein said integration means comprises means for integrating the DC signal over each of said n intervals and means for summing each integrated DC signal with the integrated DC signals obtained for the previous n−1 intervals.

7. The detection means of claim 6 wherein the carrier characteristic is phase angle and 4φ phase shift keying modulation is employed to transmit two data bits during each baud period and said integrating means integrates two DC signals during each interval, one corresponding to the in phase component and the other the quadrature component of the carrier signal.

8. The detection means of claim 7 wherein said integration means comprises two pairs of integrators, one pair for integrating during odd numbered intervals and the other pair for integrating during even numbered intervals with each pair being set to a predetermined initial state during its nonintegration interval.

9. The detection means of claim 8 wherein said integration means includes means for converting the analog output of each integrator to an equivalent digital value, a plurality of digital registers for storing the digital values and a digital adder for summing the digital values.

10. A method for detecting digital data borne by a carrier signal via a predetermined variation in some characteristic thereof during each baud period with respect to the same characteristic of the carrier signal during the previous baud period, comprising:
converting the carrier signal characteristic to a DC signal indicative of the digital data;
subdividing each baud period into n plural intervals;
integrating the DC signal over a baud period beginning with the inception of each of said n intervals and storing same for an additional baud period;
comparing each integrated DC signal with the integrated DC signal obtained n intervals previously to provide an indication of the data baud value, and storing each such data baud value.

11. The method of claim 10 wherein said subdividing is synchronized to an AC signal and n is equal to the number of zero crossings of said AC signal during each baud period, and whereby each interval is initiated at one of the zero crossings.

12. The method of claim 11 wherein said integrating comprises integrating the DC signal over each of said n intervals and summing each integrated DC signal with the integrated DC signals obtained for the previous n−1 intervals.

13. The method of claim 12 wherein the carrier characteristic is phase angle and 4φ phase shift keying modulation is employed to transmit two data bits during each baud period and said integrating comprises integrating in DC signals during each interval, one corresponding to the in phase component and the other the quadrature component of the carrier signal.

14. Detection means for detecting digital data borne by a carrier signal via a predetermined variation in some characteristic thereof during each baud period with respect to the same characteristic of a reference signal, comprising:
means for converting the carrier signal characteristic variation to a DC signal indicative of the digital data;
timing means for subdividing each baud period into n plural intervals;
integration means for integrating the DC signal over a baud period beginning with the inception of each of said n intervals;
means for converting the integrated DC signal to its equivalent data baud value, and
storage means for storing each such data baud value.

15. The detection means of claim 14 wherein said storage means comprises n registers and means for sequentially entering the data baud values in said registers on a cyclical basis.

16. The detection means of claim 15, further including means for selecting one of said n registers from which to access the digital data.

17. The detection means of claims 14, 15, or 16 wherein said timing means is synchronized to an AC signal and n is equal to the number of zero crossings of said AC signal during each baud period, and whereby each interval is initiated at one of the zero crossings.

18. The detection means of claims 14, 15 or 16 wherein said integration means comprises means for integrating the DC signal over each of said n intervals and means for summing each integrated DC signal with the integrated DC signals obtained for the previous n−1 intervals.

19. The detection means of claim 17 wherein said integration means comprises means for integrating the DC signal over each of said n intervals and means for summing each integrated DC signal with the integrated DC signals obtained for the previous n−1 intervals.

20. The detection means of claim 19 wherein said integration means comprises two pairs of integrators, one pair for integrating during odd numbered intervals and the other pair for integrating during even numbered intervals with each pair being set to a predetermined initial state during its nonintegration interval.

21. The detection means of claim 20 wherein said integration means includes means for converting the analog output of each integrator to an equivalent digital value, a plurality of digital registers for storing the digital values and a digital adder for summing the digital values.

22. A method for detecting digital data borne by a carrier signal via a predetermined variation in some characteristic thereof during each baud period with respect to the same characteristic of a reference signal comprising:
converting the carrier signal characteristic variation to a DC signal indicative of the digital data;
subdividing each baud period into n plural intervals;
integrating the DC signal over a baud period beginning with the inception of each of said n intervals;
converting the integrated DC signal to its equivalent data baud value, and
storing each such data baud balue.

23. The method of claim 22 wherein said subdividing is synchronized to an AC signal and n is equal to the number of zero crossings of said AC signal during each baud period, and whereby each interval is initiated at one of the zero crossings.

24. The method of claim 23 wherein said integrating comprises integrating the DC signal over each of said n intervals and means for summing each integrated DC signal with the integrated DC signals obtained for the previous n−1 intervals.

* * * * *